(12) United States Patent
Vasudev

(10) Patent No.: US 10,761,020 B2
(45) Date of Patent: Sep. 1, 2020

(54) METHOD AND APPARATUS FOR THE SPECTROSCOPIC DETECTION OF LOW CONCENTRATIONS OF HYDROGEN SULFIDE GAS

(71) Applicant: California Institute of Technology, Pasadena, CA (US)

(72) Inventor: Ramabhadran Vasudev, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 248 days.

(21) Appl. No.: 15/752,877

(22) PCT Filed: Sep. 1, 2016

(86) PCT No.: PCT/US2016/049988
§ 371 (c)(1),
(2) Date: Feb. 14, 2018

(87) PCT Pub. No.: WO2017/040848
PCT Pub. Date: Mar. 9, 2017

(65) Prior Publication Data
US 2018/0252641 A1    Sep. 6, 2018

Related U.S. Application Data

(60) Provisional application No. 62/213,545, filed on Sep. 2, 2015.

(51) Int. Cl.
*G01N 21/00* (2006.01)
*G01N 21/39* (2006.01)
(Continued)

(52) U.S. Cl.
CPC .......... *G01N 21/39* (2013.01); *G01N 21/031* (2013.01); *G01J 3/42* (2013.01); *G01J 2003/423* (2013.01);
(Continued)

(58) Field of Classification Search
CPC ............ G01N 21/0303; G01N 21/314; G01N 21/3504; G01N 21/552; G01J 3/42; G01J 2003/421; G01J 2003/423; G01J 2003/425
(Continued)

(56) References Cited

U.S. PATENT DOCUMENTS 6,657,198 B1    12/2003  May
7,301,639 B1 *  11/2007  Kebabian ............. G01N 21/031
                                                356/437
(Continued)

FOREIGN PATENT DOCUMENTS

EP    3344962 A1    7/2018
WO    2013121174 A1    8/2013
WO    2017040848 A1    3/2017

OTHER PUBLICATIONS

Extended European Search Report for European Application No. 16843018.9, Search completed Jan. 14, 2019, dated Feb. 11, 2019, 13 Pgs.
(Continued)

*Primary Examiner* — Sunghee Y Gray
(74) *Attorney, Agent, or Firm* — KPPB LLP

(57) ABSTRACT

Spectroscopic apparatus and methods incorporating a gas sensor configured to detect low concentration gases, including gases that are hazardous volatiles are provided. Low concentration gases can comprise gases where detection of concentrations on the order of parts-per-million (ppm), and in many embodiments part-per-billion (ppb) is required. The
(Continued)

gas may be a species, such as, for example hydrogen sulfide (H$_2$S) that may be produced in drilling and/or volcanic eruptions. The spectroscopic apparatus and methods are configured to operate in particular atmospheres where gas detection can be challenging, such as in ambient air and/or in space where various contaminants may be present. The spectroscopic apparatus and methods may incorporate a long path length detector, such as, for example, a cavity-enhanced absorption spectrometer. The methods and apparatus further incorporate a wavelength modulation technique to improve the signal-to-noise ratio.

17 Claims, 9 Drawing Sheets

(51) Int. Cl.
 *G01N 21/03* (2006.01)
 *G01J 3/42* (2006.01)
(52) U.S. Cl.
 CPC ............... *G01N 2021/391* (2013.01); *G01N 2201/0698* (2013.01)
(58) Field of Classification Search
 USPC .................................................. 356/436–438
 See application file for complete search history.

(56) References Cited

U.S. PATENT DOCUMENTS

| | | | | |
|---|---|---|---|---|
| 8,149,407 B1* | 4/2012 | Rao | ........................ | G01N 21/39 356/437 |
| 8,654,334 B1* | 2/2014 | Gupta | .................... | G01N 21/33 356/437 |
| 9,110,006 B1* | 8/2015 | Hovde | ................. | G01N 21/255 |
| 2007/0076209 A1* | 4/2007 | Baer | ................. | G01N 21/3504 356/454 |
| 2008/0111993 A1 | 5/2008 | Miller | | |
| 2010/0103413 A1* | 4/2010 | Gohle | ....................... | G01J 3/10 356/319 |
| 2012/0300209 A1* | 11/2012 | Witinski | ............ | G01N 21/3504 356/409 |
| 2013/0022688 A1 | 1/2013 | Cooper | | |
| 2014/0124672 A1* | 5/2014 | Stock | ................... | G01N 21/031 250/343 |
| 2017/0336320 A1* | 11/2017 | Yalin | ........................ | G01J 3/42 |

OTHER PUBLICATIONS

International Preliminary Report on Patentability for International Application No. PCT/US2016/049988, Report dated Mar. 6, 2018, dated Mar. 15, 2018, 10 Pgs.
International Search Report for International Application No. PCT/US2016/049988; Search completed Nov. 28, 2016, dated Nov. 29, 2016, 12 pgs.
Bakhirkin et al., "Mid-infrared quantum cascade laser based off-axis integrated cavity output spectroscopy for biogenic nitric oxide detection", Applied Optics, vol. 43, No. 11, Apr. 10, 2004, pp. 2257-2266.
Bakhikrin et al., "Wavelength Modulation Off-Axis Integrated Cavity Output Spectroscopy for Biogenic NO detection in Human Breath", Lasers and Electro-Optics (CLEO), San Francisco, California, May 16-21, 2004, 2 pgs.
Mazurenka et al., "Cavity ring-down and cavity enhanced spectroscopy using diode lasers", Royal Society of Chemistry, Annual Reports on the Progress of Chemistry, Section C, vol. 101, Jan. 1, 2005, pp. 100-142.
Rothman et al., "The HITRAN 2008 molecular spectroscopic database", Journal of Quantitative Spectroscopy & Radiative Transfer, Feb. 13, 2009, vol. 110, p. 533-572.
Tarka et al., "Sulfur dioxide detection using 7.4 μm DFB-QCL based cavity enhanced absorption spectroscopy", CLEO, The Optical Society, San Jose, California, Jun. 9-14, 2013, 2 pgs.
Vasudev et al., "Highly Sensitive Tunable Diode Laser Spectrometers for In Situ Planetary Exploration", No. 2371.3, IEEE Aerospace Conference, Big Sky, Montana, Mar. 2-9, 2013, 8 pgs.
Vasudev et al., "Planetary laser spectrometer for sensitive in situ detection of water at 1881 nm", Planetary & Space Sci., Mar. 2014, vol. 92, pp. 127-135.
Vasudev et al., "Wavelength modulated cavity enhanced absorption spectroscopy of ammonia at 1994 nm", Applied Physics B, Mar. 2007, vol. 87, pp. 163-167.
Vasudev et al., "Wavelength Modulated Cavity Enhanced Absorption Spectroscopy of Water in the 1.37 μm Region", Applied Spectroscopy, 2006, vol. 60, No. 8, pp. 926-930.
Yu et al., "Trace H2S monitoring based on off-axis integrated cavity output spectroscopy", SPIE, International Conference on Optical Instruments and Technology: Optical Systems and Optoelectronic Instruments, Beijing, China, 2008, 6 pgs.
Zhao et al., "Wavelength modulated off-axis integrated cavity output spectroscopy in the near infrared", Applied Physics B, Lasers and Optics, vol. 86, No. 2, Sep. 29, 2006, pp. 353-359.

* cited by examiner

METHOD AND APPARATUS FOR THE SPECTROSCOPIC DETECTION OF LOW CONCENTRATIONS OF HYDROGEN SULFIDE GAS

CROSS-REFERENCE TO RELATED APPLICATIONS

The present application is a national stage of PCT/US2016/049988, entitled "Method and Apparatus for the Spectroscopic Detection of Low Concentrations of Hydrogen Sulfide Gas" to Vasudev, filed Sep. 1, 2016, which application claims priority to U.S. Patent Application No. 62/213,545, entitled "In Situ H2S Sending Using Wavelength Modulated (WM) Cavity Enhanced Absorption Spectroscopy (CEAS)" to Vasudev, filed Sep. 2, 2015, the disclosures of which are incorporated herein by reference in their entireties.

FEDERAL SUPPORT STATEMENT

The invention described herein was made in the performance of work under a NASA contract NNN12AA01C, and is subject to the provisions of Public Law 96-517 (35 USC 202) in which the Contractor has elected to retain title.

FIELD OF THE INVENTION

The current application is directed generally to spectroscopic apparatus for the detection of low concentration gases and methods of detecting low concentration gases using spectroscopic apparatus.

BACKGROUND OF THE INVENTION

Many industries, including oil and mining, certain manufacturing, waste treatment and disposal, as well as emergency services, rely on various gas detection systems to protect their workforce and infrastructure from exposure to toxic, corrosive, combustible, or flammable volatiles in the field. Exposure to even trace (few parts per million or less) amounts of airborne substances such as ammonia ($NH_3$), arsine ($AsH_3$), carbon monoxide (CO), chlorine ($Cl_2$), hydrogen cyanide (HCN), hydrogen sulfide ($H_2S$), phosphine ($PH_3$), and sulfur dioxide ($SO_2$) can be very harmful to human health and, in some instances, can corrode valuable equipment. Therefore, a practical gas detector must possess exquisite sensitivity and selectivity for the relevant detrimental substances.

Currently, there exist multiple approaches to gas detection. The working mechanisms of conventional sensors, which can be packaged into portable or fixed devices, rely on semiconducting elements, oxidative/catalytic chemistries, or optical/spectroscopic measurements. While most of these detectors demonstrate very high analyte sensitivities in controlled environments, operation in complex multi-component ambient air mixtures, that include overwhelming amounts of non-essential yet spectroscopically active species, often challenges even the most sophisticated systems. In addition, some sensing schemes are affected by high water vapor content in the air (humidity) and variations in atmospheric pressure, while others have dangerously slow response times. Consequently, a highly sensitive, specific, fast, and reliable gas detection system, which functions under ambient conditions, is highly sought after for safeguarding workers within the affected industries, and for environmentally threatened populations.

SUMMARY OF THE INVENTION

Embodiments are directed to spectroscopic apparatus and methods for detecting low concentration gases, and particularly for detecting gases with inherently weak spectroscopic signature and subject to high signal contamination from other spectroscopically active species.

Many embodiments are directed to spectroscopic apparatus including:
- a cavity defining a volume, the cavity having at least one gas inlet and one gas outlet for introducing gaseous samples into and extracting gaseous samples from said volume, and one optical inlet and one optical outlet for introducing an intense collimated light into said cavity and extracting an analyte absorption signal from said cavity;
- two mirrors having characteristic reflectivity disposed on opposite ends of said cavity and configured to form an optical path there between having a characteristic physical length;
- a light source capable of producing the intense collimated light disposed in optical alignment with the one optical inlet and configured to introduce the light beam into said cavity along said optical path, the light having a characteristic optical wavelength selected to correspond with at least one absorption wavelength of a selected gaseous analyte;
- a driver electronics interfaced with the light source and configured to tune and modulate the wavelength of the light;
- wherein the mirrors and the light source are disposed such that the light introduced into the optical cavity along the optical path is reflected between the two mirrors such that a majority of the light undergoes multiple passes through the cavity prior to exiting the optical outlet, such that a cumulative optical path length travelled by the light while within the cavity is significantly greater than the physical length of the cavity;
- a detector disposed in optical alignment with the optical outlet and configured to detect the gaseous analyte's absorption signal at a selected analyte wavelength; and
- wherein the analyte wavelength, the mirror reflectivity and the physical length of the optical path are selected to maximize the cumulative optical path length.

In other embodiments the light source is a tunable laser capable of emitting in a wavelength range selected from the group consisting of at ultraviolet, visible and infrared wavelengths.

In still other embodiments the physical length of the cavity is less than a meter long and the cumulative optical path length is greater than a kilometer.

In yet other embodiments the gaseous sample comprises a mixture of species and the analyte wavelength is selected such that it does not overlap with the absorption lines of other species disposed in the gaseous sample.

In still yet other embodiments the two mirrors comprise a pair of plano-concave mirrors.

In still yet other embodiments the gas inlet and outlet incorporate at least one valve each, and wherein the gas outlet is connected to a vacuum pump capable of inducing a flow of the gas sample through the cavity.

In still yet other embodiments the light source is disposed such that the light is introduced into the cavity in a geometry that is off-axis from the optical path.

In still yet other embodiments the apparatus further includes a collimating lens between the light source and the optical inlet.

In still yet other embodiments the light source is operated in a pulsed mode to produce a transient cavity transmission, and wherein the transient cavity transmission is monitored, and the reflectivity of the mirrors and the cumulative optical path length achieved are determined using the relationship for time-dependence of the transient signal:

$$I(t)=I(t=0)\exp(-t/\tau)$$

wherein I(t) is an intensity at a time t, $\tau=d/\{c|\ln(R)|\}$ is a 1/e (first order) decay constant of a transient signal, d is the physical length of the optical path, c is the speed of light and R is the reflectivity of the mirrors.

In still yet other embodiments the selected analyte is $H_2S$, and wherein the analyte wavelength is selected from one of 8000-9000 nm, 1900-2000 nm, and 1563-1626 nm regions. In some such embodiments the analyte wavelength is selected from one of 1575 nm, 1977 nm and 8100 nm, and wherein the apparatus is capable of detecting the selected analyte at concentrations on the order of a few hundred ppb.

Many other embodiments are directed to methods of detecting a gaseous species including:
- introducing a gas sample comprising a mixture of species disposed therein into a cavity defining a volume through at least one gas inlet configured to allow the introduction of gas samples into said volume, wherein the cavity comprises two mirrors having characteristic reflectivity disposed on opposite ends of said cavity and configured to form an optical path there between, the optical path having a characteristic physical length;
- producing a wavelength modulated light;
- injecting the light through an optical inlet disposed in the cavity such that the light travels along said optical path, the light having a characteristic wavelength selected to correspond with at least one absorption wavelength of a target analyte;
- allowing the injected light to be reflected between the two mirrors such that a majority of the light undergoes multiple passes through the cavity, such that a cumulative optical path length travelled by the light within the cavity is much greater than the physical length of the cavity;
- detecting an analyte absorption from the transmission of light through the cavity with a detector positioned outside the cavity and configured to detect the analyte absorption from the target analyte in the gas sample at the at least one absorption wavelength; and
- wherein the at least one absorption wavelength of the target analyte is selected from within one or more wavelength regions at which the target analyte absorbs and at which the other species in the gas sample do not absorb; and
- wherein the mirror reflectivity and the physical length of the cavity are selected to maximize the cumulative optical path length.

In various other embodiments the method further involves using a vacuum pump to introduce a pressure differential between the cavity and an external sample source, thus inducing a flow of the sample through the cavity.

In still other embodiments the light is introduced into the cavity in a geometry that is off-axis from the optical path.

In yet other embodiments the method further includes disposing a collimating lens between the light source and the optical inlet.

In still yet other embodiments the method further includes prior to detecting a target analyte determining the reflectivity of the two mirrors and the cumulative path length comprising the steps of:
- evacuating the cavity;
- injecting pulsed light from a light source into said cavity along the optical path;
- detecting the light transmitted through the cavity; and
- monitoring the decay of the transmitted light over time to determine the decay constant of the transient signal.

In some such embodiments the light source is used in a pulsed mode and the transient transmission is monitored, and the reflectivity of the cavity mirrors and the cumulative optical path length achieved are determined using the relationship for time-dependence of the transient signal:

$$I(t)=I(t=0)\exp(-t/\tau)$$

wherein I(t) is an intensity at a time t, $\tau=d/\{c|\ln(R)|\}$ is a 1/e (first order) decay constant of a transient signal, d is the physical length of the optical path, c is the speed of light and R is the reflectivity of the mirrors. In still yet other embodiments the target analyte is $H_2S$, and wherein the absorption wavelength is selected from one of 8000-9000 nm, 1900-2000 nm, and 1563-1626 nm regions.

In still yet other embodiments the absorption wavelength is selected from one of 1575 nm, 1977 nm and 8100 nm regions, and wherein the method is capable of detecting the target analyte at concentrations on the order of few hundred ppb.

In still yet other embodiments the suitable absorption wavelength is determined by analysis of the analyte and other species absorption spectrum from the HITRAN spectroscopic database.

Additional embodiments and features are set forth in part in the description that follows, and in part will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying data and figures, wherein.

DETAILED DESCRIPTION OF THE INVENTION

The embodiments of the invention described herein are not intended to be exhaustive or to limit the invention to precise forms disclosed. Rather, the embodiments selected for description have been chosen to enable one skilled in the art to practice the invention.

Turning now to the drawings, spectroscopic apparatuses and methods for detecting low concentration gases are provided. In accordance with many embodiments the spectroscopic apparatus and methods incorporate a gas sensor configured to detect low concentration gases, and in various embodiments gases that are hazardous (e.g., toxic, corrosive, combustible, flammable, etc.) volatiles. In various embodiments, low concentration gases can comprise gases where the detection of concentrations on the order of parts-per-million (ppm), and in many embodiments part-per-billion (ppb) is required. In many such embodiments the gas may be a species, such as, for example hydrogen sulfide ($H_2S$) that may be produced in drilling and/or volcanic eruptions. In some embodiments the spectroscopic apparatus and methods are configured to operate in particular atmospheres where gas detection can be challenging, such as in ambient air where various contaminants may be present. In various embodiments the spectroscopic apparatus and methods comprise a long path length detector, such as, for example, a cavity-enhanced absorption spectrometer. In many such embodiments the path length and optics of the spectrometer may be configured to detect a specific wavelength selected to avoid regions of the spectrum where contaminant species may also absorb. In some such embodiments the methods and apparatus further incorporate a wavelength modulation technique to improve signal-to-noise ratio.

Spectroscopic apparatus and methods incorporating such embodiments offer a major improvement in sensitivity and selectivity over currently available gas detection systems. More specifically, the sensor is designed to identify minute amounts of otherwise hard to detect substances in complex gaseous mixtures, including in ambient air.

Figure 1:
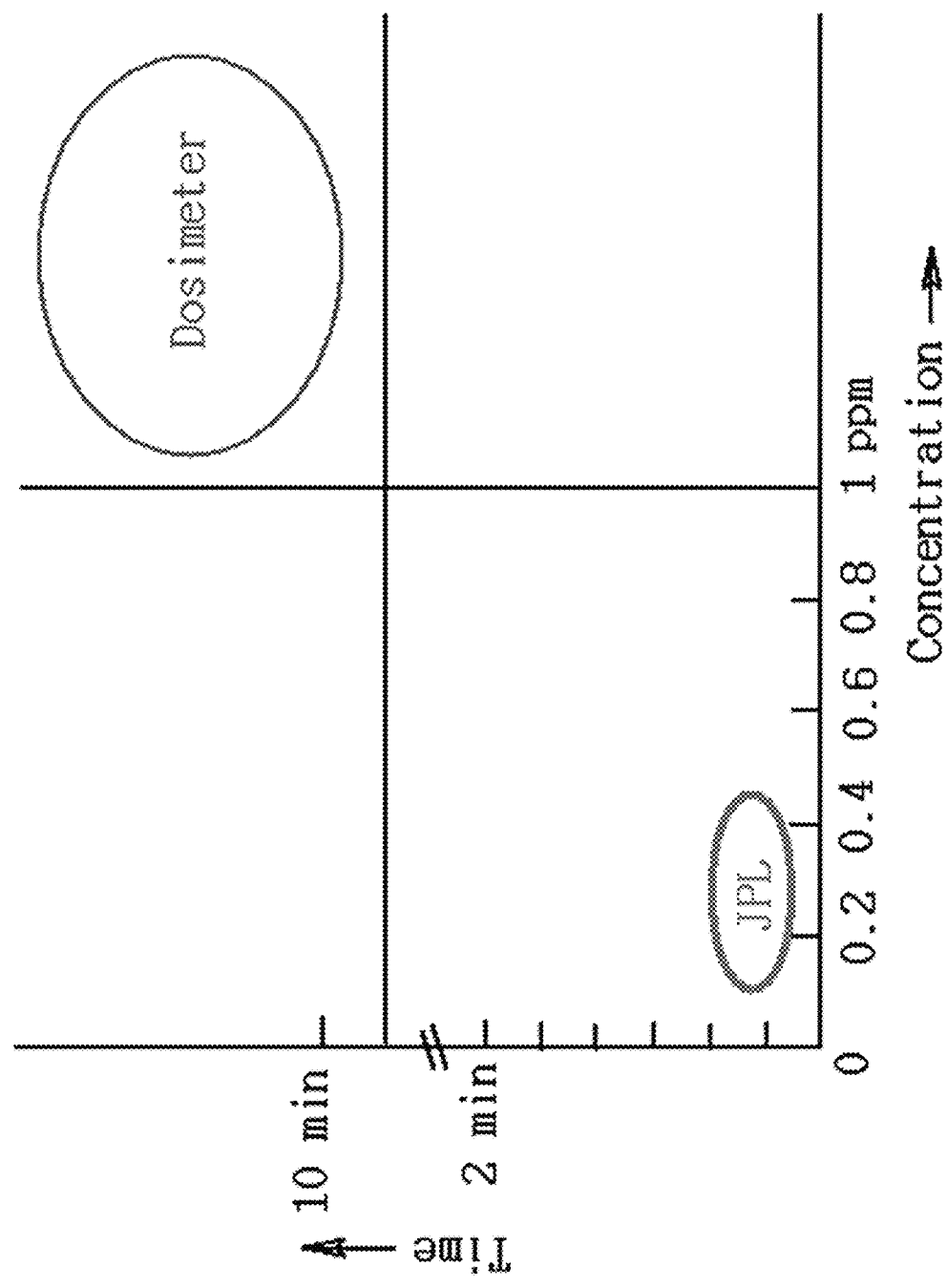
FIG. 1 shows a plot comparing performance between spectroscopic apparatus and methods in accordance with embodiments of the current invention and a conventional dosimeter method.

Currently, there are a variety of conventional gas detection techniques that have been proposed for use in detecting low concentration gases. Some such techniques utilize electrochemical approaches, which rely on polymeric or solid electrolytes for amperometry, for low concentration gas sensing. Although such techniques are robust, they have significant deficiencies, demonstrating insufficient analyte sensitivities, for example, being restricted to gases presented in relatively high parts-per-million (ppm) concentrations. Other conventional devices incorporate gas detection methods such as, for example, semiconductor metal oxide-based devices. Unfortunately, such semiconductor-based techniques also have subpar analyte sensitivities, similar to those of electrochemical methods, as well as limited selectivity against other ambient gases, and high sensitivity to ambient humidity. Yet other detection methods for low concentration gases are based on chemical dosimetry, where chemical sensors change color in an analyte's presence in such a way that the extent of the color change is proportional to the analyte's concentration and the overall exposure time, thus, providing a measure of cumulative exposure dose. Chemical dosimetry methods have excellent analyte specificity, however, as shown in FIG. 1, such sensors can be precariously slow and are not very sensitive.

Still other techniques use optical methods, such as FTIR, diode laser absorption, or ultraviolet absorption for detecting low concentration gases in ambient air. In general, such spectroscopic gas detection methods have the potential to provide the highest attainable analyte sensitivity and selectivity for measurements in ambient air, in part, because they are capable of focusing the detection measurements on a specific wavelength of interest and readily avoid or minimize interferences from signals by other ambient gases. However, quite often these conventional methods have analyte sensitivities that are limited by practical apparatus design, which dictates the length of the light's path during a given measurement, and, thus, the achievable detection sensitivity.

Figure 2:
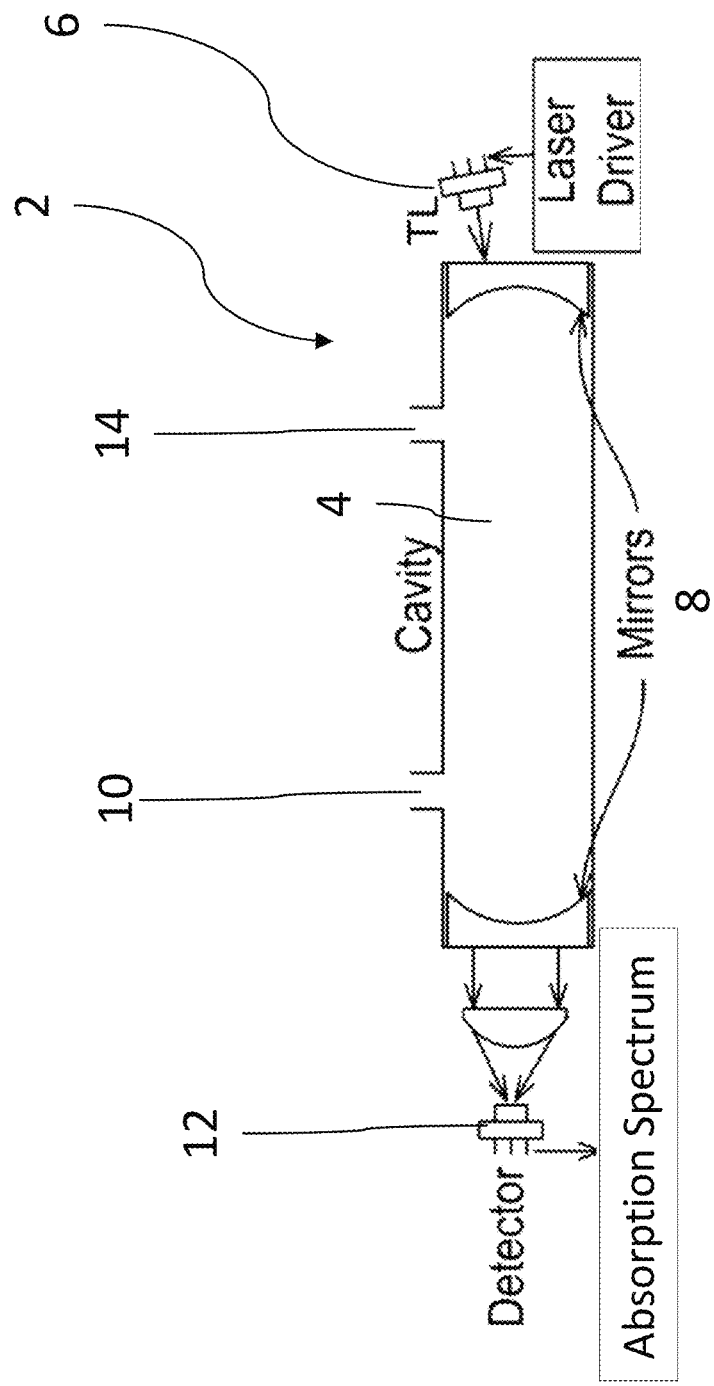
FIG. 2 provides a schematic diagram of a conventional cavity-enhanced absorption spectroscopy (CEAS) gas detector apparatus.

One potentially, promising technique that incorporates the sensitivity of optical spectroscopic techniques, but that addresses the fundamental issues presented by sample size and device architectures is cavity-enhanced absorption spectroscopy (CEAS). CEAS derives its sensitivity from the very long absorption pathlengths (few kilometers), attainable by multi-passing tunable laser light in a confocal optical cavity. An exemplary schematic diagram of such a system is provided in FIG. 2. As shown, in a CEAS apparatus (2) the cavity (4) is relatively short (less than a meter and down to a few tens of centimeters), but the injected light from a tunable laser (6) is trapped in the cavity and travels back and forth thousands of times between two highly reflecting mirrors (8), while trickling out of the cavity over time, so a cumulative pathlength of a few kilometers is possible in a compact instrument. In this setup, the gas analyte is introduced through inlets (10) and flows through the optical cavity and the target species are detected via absorption spectrum at a detector (12) obtained by monitoring the cavity transmission. Unfortunately, straightforward CEAS methods without any noise-suppressing techniques, such as wavelength modulated (WM) spectroscopy might lack the sensitivity necessary for detection of some weakly absorbing gases, such as, for example, $H_2S$, and especially in a compact instrumental set-up, because of optical interference effects (fringes) generated by the optical cavity. As such, these fringes show up in the cavity transmission as undulations superimposed on the absorption spectrum of a sample in the cavity, thus lowering the signal-to-background and compromising the detection sensitivity.

As previously discussed, a variety of hazardous or other gases of interest may be present in different environments at concentrations that make them difficult to detect in a timely manner. One gas that exemplifies these twin challenges (e.g., that is difficult to detect, but also important to detect, both for the fact of its presence and also because it represents a distinct hazard) is hydrogen sulfide ($H_2S$).

Hydrogen sulfide is a colorless, highly toxic, corrosive, and explosive gas, which is formed in natural subsurface geological processes or during anoxic bacterial decomposition of organic matter. Consequently, it is commonly released as a by-product of oil and gas exploration (including emissions from oil and gas fields, tankers, production facilities and industrial operations), especially in regions of sour gas production, at waste management sites, or during volcanic eruptions. Moreover, hydrogen sulfide can cause corrosion of pipelines and other field infrastructure, while exposure to only a few hundred parts-per-billion (ppb) can pose extreme health risks, as manifested by fatigue, headache and dizziness, while exposure to many parts-per-million (ppm) concentrations can be fatal.

Figure 3A:
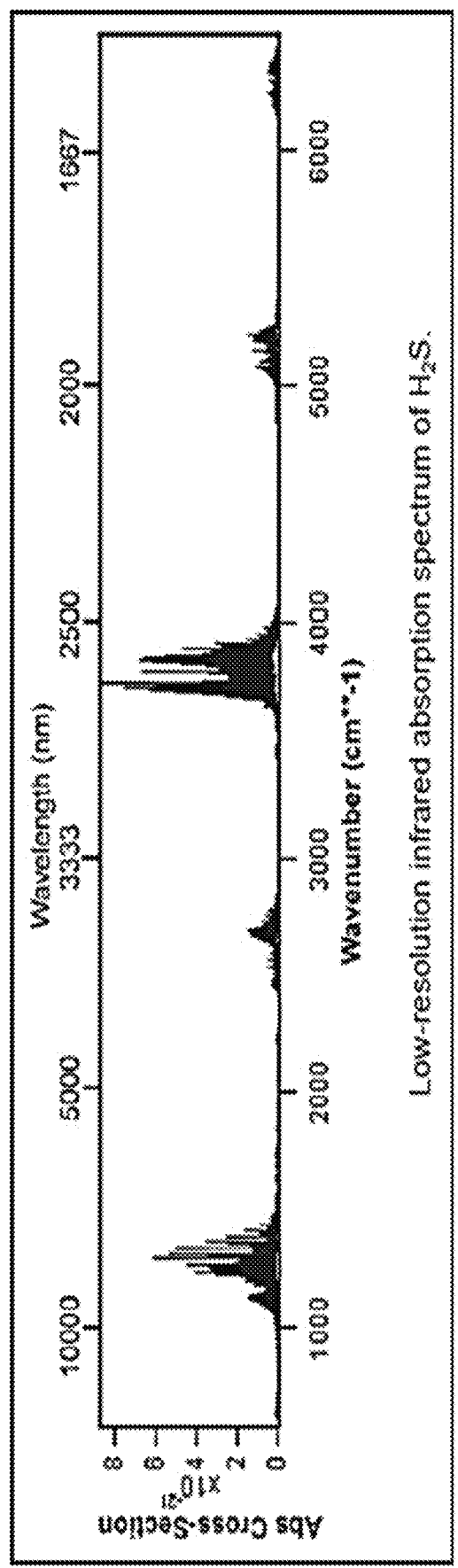
FIGS. 3A-C provides infrared absorption spectra of hydrogen sulfide ($H_2S$), water vapor ($H_2O$), and carbon dioxide ($CO_2$).
Figure 3B:
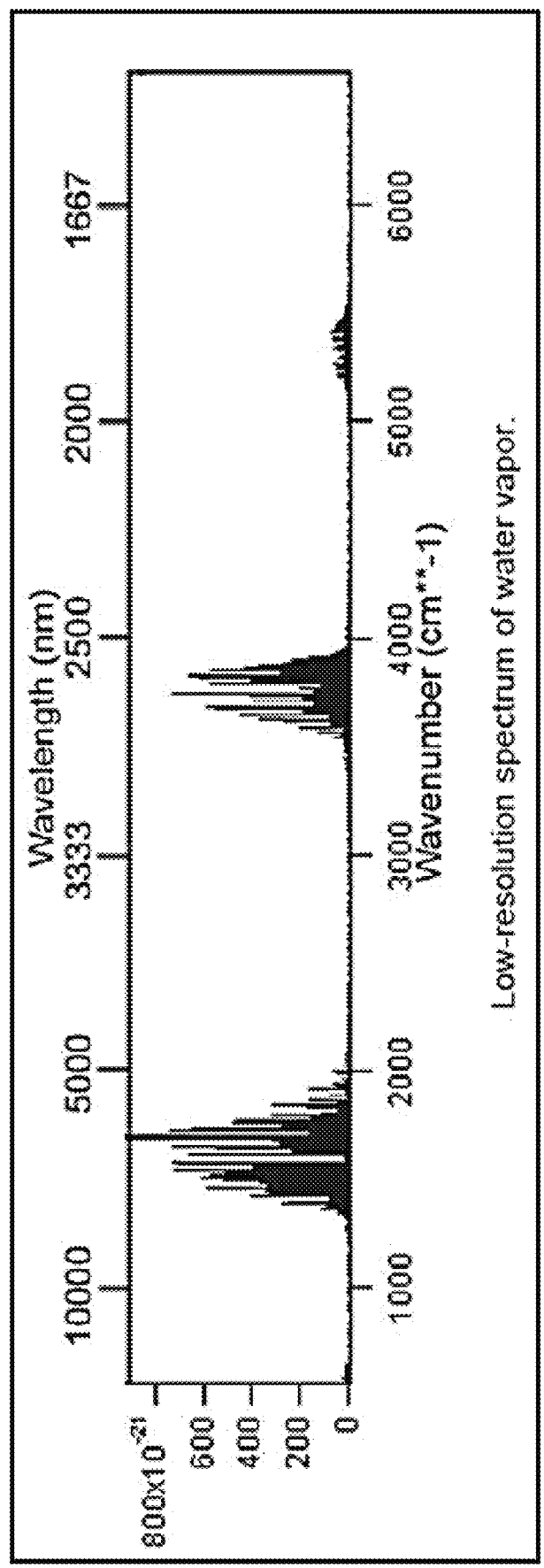
Figure 3C:
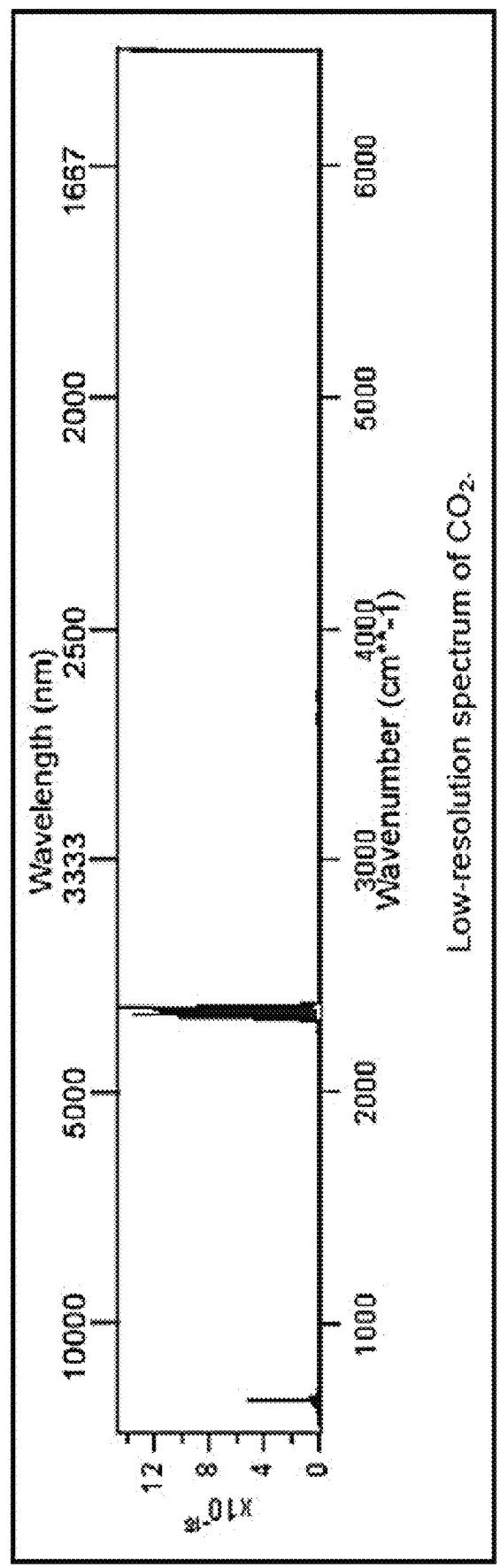

Due to its extreme toxicity and its presence in environments where populations are likely to be exposed, $H_2S$ is one of the key ambient air gases requiring active detection and management. Unfortunately, as with many hazardous low concentration volatiles with weak spectroscopic signatures, there are a number of potent IR absorbers in the ambient environment that make detection of $H_2S$ difficult, even with the most advanced optical techniques. For example, as shown in FIGS. 3A-C, water vapor, with an absorption cross-section two orders of magnitude higher than that of $H_2S$, and carbon dioxide, with 3-4 orders of magnitude higher both overlap all of the strongest absorption peaks of $H_2S$. Accordingly, conventional techniques are not able to identify contributions from gases, such as $H_2S$, at the concentration levels (e.g., few hundred ppb) that are needed to provide a safety factor to those that might be exposed to such a gas.

Description of Spectroscopic Apparatus in Accordance with Embodiments

In embodiments of the current disclosure, high-resolution infrared (IR) absorption fingerprints of a volatile substance are obtained and identified via an exceptionally sensitive spectroscopic technique that combines cavity-enhanced absorption spectroscopy (CEAS) and wavelength modulated (WM) spectroscopy. (See, e.g., R. Vasudev, et al., IEEE Aerospace Conference, Big Sky, Mont., Mar. 2-9, 2013; R. Vasudev, et al., Planetary & Space Sci., 92, 127 (2014); R. Vasudev, App. Phys. B, 87, 163-167 (2007); and R. Vasudev, App. Spec., 60, 926-930 (2006), the disclosures of each of which are incorporated herein by reference.) Exquisite sensitivity may be obtained utilizing embodiments of the detector apparatus and method by multi-passing a highly collimated light (e.g., laser light) through an optical cavity, where a cumulative beam path length of a few kilometers can be achieved even in an optical cavity of modest size (as short as 10"). In such embodiments, the absorption spectrum of the sample in the cavity is obtained by monitoring the absorption losses in light exiting the cavity while tuning the excitation wavelength with a detector. Since the underlying measurement of embodiments of the current disclosure depends on intra-cavity optical losses only, and not on the precise beam alignment, it is not necessary to rigorously align the cavity or select the light injection geometry, resulting in a detection instrument insensitive to misalignment caused by mechanical vibrations and, thus, highly suitable for field deployment.

Figure 4:
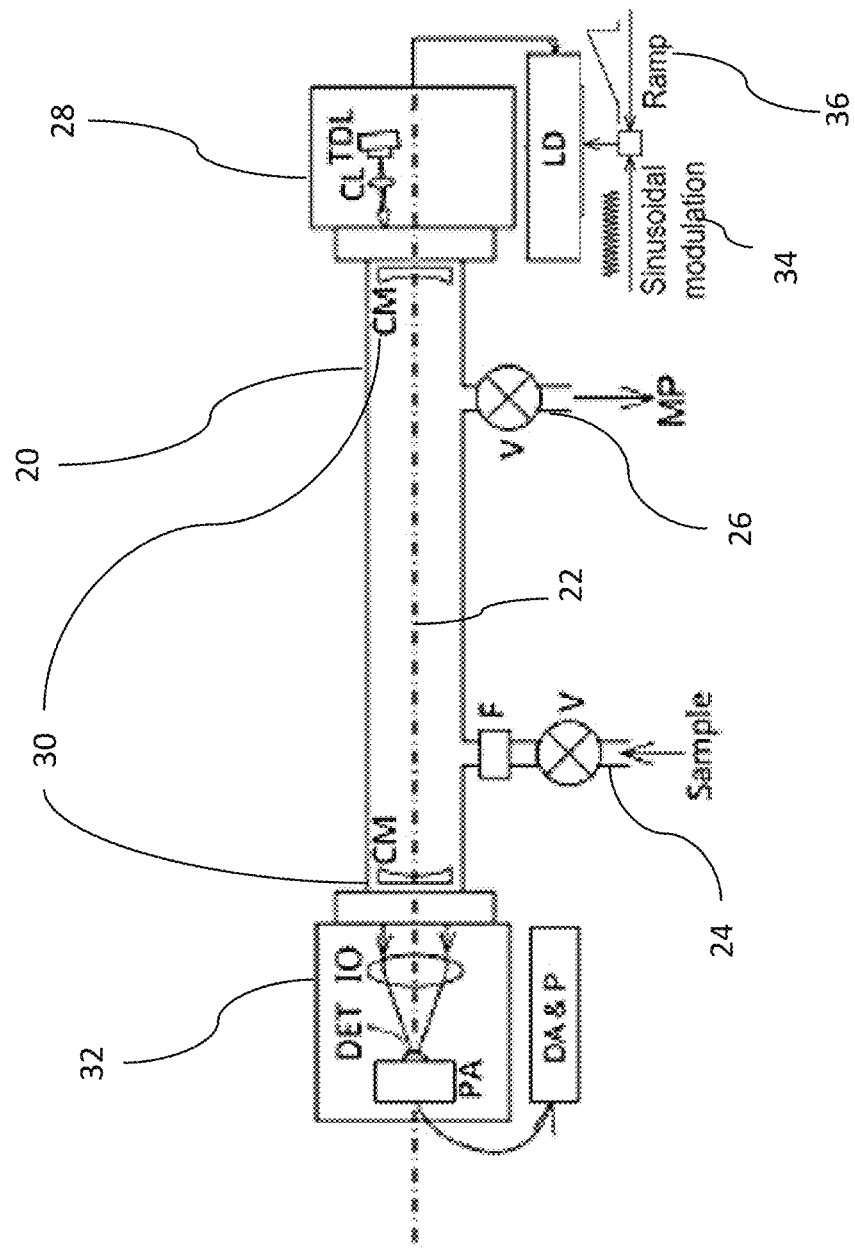
FIG. 4 provides a schematic diagram of spectroscopic apparatus for the detection of low concentration gases in accordance with the embodiments of the current invention.

FIG. 4 provides a schematic diagram of a WM-CEAS detector in accordance with various embodiments. As shown, various embodiments of the CEAS detector include a cavity (20) defining an internal volume that defines a physical optical path (22) through which a gas species may be introduced via one or more gas inlet and pumped out via one or more gas outlets (24 & 26) (e.g., that may include appropriate valves (V) for controlling flow rate, pumps (MP), and particulate filters (F)), and into which light from a light source (e.g., from a tunable laser) (28) may be injected into the cavity through an optical inlet. The cavity is bounded at either end by a pair of optical mirrors (30). Although as shown in FIG. 4, in some embodiments the light source (28) may be positioned at one end of the cavity (20) and the miniature detector (32) at the opposite end, it should be understood that these elements may be positioned in any convenient position such that the source of light (e.g., visible, IR and/or UV light, such as for example may be produced by a tunable laser) may be introduced into the optical path such that the light travels along the optical path between the optical mirrors, and such that the detector (32) located next to the output mirror detects the cavity transmission such as through an optical outlet. For example, in many embodiments of the detector apparatus and a light source (e.g., a tunable laser) (28) may be disposed and configured such that the light is injected into the optical cavity in an off-axis manner, in order to lower the laser beam overlap within the cavity and, thus, reduce optical fringes.

Turning to the elements of the spectroscopic apparatus, it will be understood that many interchangeable elements may be used to provide a great deal of flexibility to the CEAS spectroscopic apparatus in accordance with embodiments. In many embodiments the cavity (20) may comprise any suitable enclosed volume that provides an optical path (22) between two mirrors (e.g., plano-concave mirrors) (30) disposed and configured to reflect the injected-light back and forth multiple times between the mirrors and generating a cumulative pathlength far greater than the physical separation between the mirrors.

Similarly, any suitable inlet (24) and outlet (26) may be used to inject a gas sample into the cavity. For example, the inlet and outlet may be valved (V) to control the flow of gas into and out of the cavity, and include particulate filters (F) to remove particulates. In addition, the outlet may include a driving pump (MP) to ensure a continuous flow and optimal pressure of the gas sample in the system. Although one inlet and one outlet are shown in FIG. 4, it should be understood that any number and arrangement of inlets and outlets may be provided that allow the introduction of a gas into the cavity.

The light source (28) may also take any suitable form. In many embodiments, as shown, the light source may include a tunable laser capable of producing light within a selected wavelength range (e.g., infrared, visible or ultraviolet). To generate tunable light, a laser driver (LD) capable of tuning the wavelength of the light may be used in accordance with embodiments. In addition, collimating optics (CL) may be incorporated into the design to condition the light prior to injecting it into the cavity.

Finally, the detector DET (32) may be positioned in any geometry suitable along the cavity axis to detect light exiting the cavity. Any light sensitive element suitable for use in sensing absorption at a selected wavelength may be used. In many embodiments, the detector may be, for example, a sensitive photodiode for infrared wavelengths, or photomultiplier for visible and ultraviolet wavelengths, etc. In accordance with various embodiments, the detector may also be provided with imaging optics (IO) suitable for focusing light on the light sensing element. In accordance with many embodiments the detector may also include suitable electronics for amplifying and analyzing the signals produced from the detector, including, for example pre-amplifiers (PA) and data acquisition and processing electronics (DA&P).

To improve the detection sensitivity and allow for the detection of low concentration gases at the ppm and ppb concentration ranges, embodiments of the apparatus and method further incorporate wavelength modulation (WM) into the CEAS measurement. In WM spectroscopy, the light wavelength is also modulated by superimposing a small sinusoidal waveform of a frequency f on top of the voltage ramp, as shown in FIG. 4, (34 and 36). In such embodiments, the detector signal is pre-amplified (PA) and fed into a phase-sensitive detector to generate a 2f signal. Utilizing such a technique one obtains a 2f spectrum wherein each absorption line has a second-derivative-type shape, as shown for the high resolution spectra in FIGS. 6 and 7. Incorporating WM in embodiments of the apparatus and methods helps to suppress undulations (optical fringes) in the cavity transmission spectrum arising from the overlap of laser light circulating within the optical cavity, thus reducing the signal-to-background noise ratio in the absorption spectrum and improving the detection sensitivity. In addition, WM aids in reduction of noise from lasers and detectors, enhancing the signal-to-noise ratio even further, and allowing weakly absorbing gases to be detected. Overall, apparatus and methods using the WM-CEAS spectroscopy combination in accordance with embodiments allows for the detection of a fractional absorption ($\Delta I/Io$), as small as ~$5 \times 10^{-5}$ (i.e., one part in 20,000) in many cases, for a path length of a few km.

Determination of Optical Set-Up in Accordance with Embodiments

Figure 5:
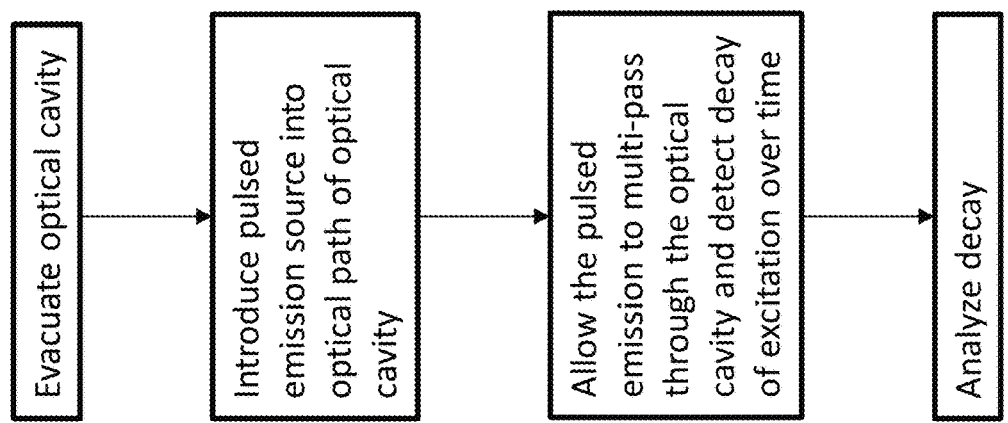
FIG. 5 provides an optical layout, and a process for determining absorption path length employed in cavity-enhanced absorption spectroscopy (CEAS) in accordance with embodiments of the current invention.
Figure 5:
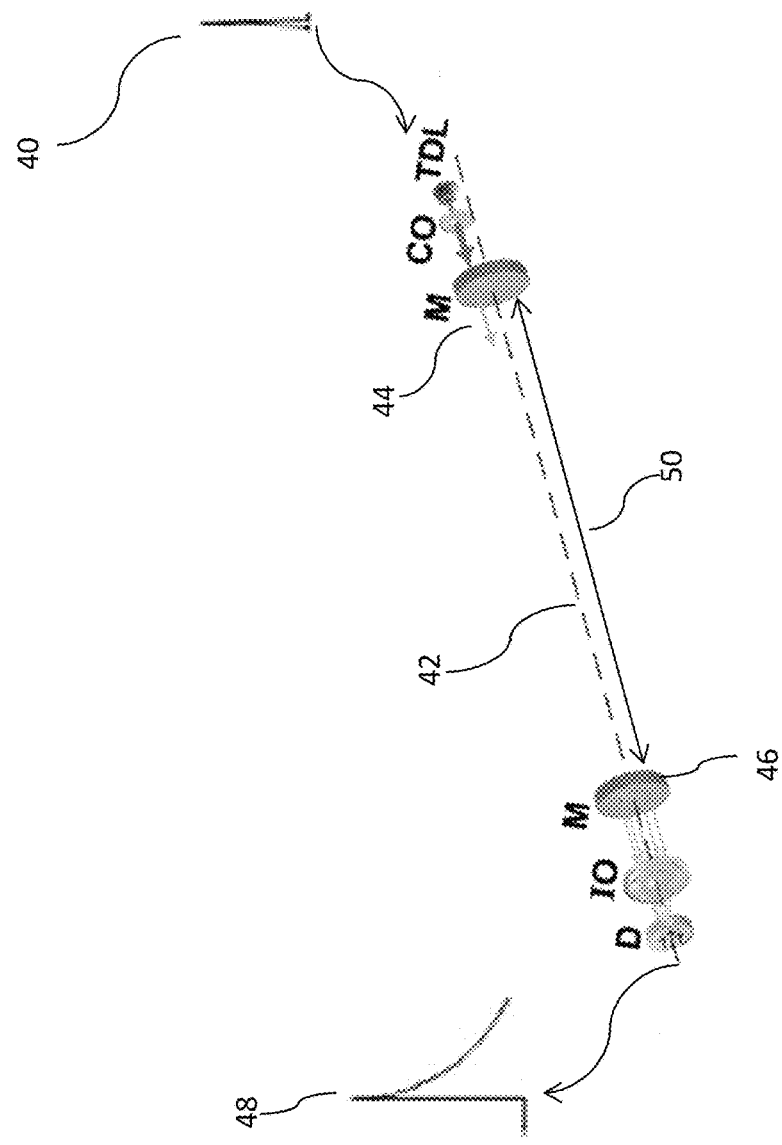

In the context of apparatus configuration in accordance with many embodiments, to obtain the sensitivities necessary to detect low concentration gases the optical set-up and absorption path length is determined based on the specific absorption wavelength to be monitored for the species to be detected. Specifically, in many embodiments the optical configuration (e.g., path length) is determined experimentally. In some such embodiments, as summarized in the diagram and flow chart provided in FIG. 5, the optical configuration is determined by operating the light source (e.g., tunable diode laser, TDL) in a pulsed mode (e.g., by applying a current pulse (40) to the light source from a pulsed driver) and injecting the light into the optical cavity (42), which may be evacuated. In such embodiments, the injected pulsed light (44) travels back and forth between the cavity mirrors (M) thousands of times and, at each reflection off the exit mirror (46), a very small amount of pulsed light exits the cavity. The intensity (48) of the exiting light decays exponentially over a period of time (e.g., many microseconds), depending on the reflectivity of the mirrors and the cavity length (50), as shown in FIG. 5.

Analysis of the exponentially decaying transient signal yields the path length achieved in accordance with:

$$I(t)=I(t=0)\exp(-t/\tau) \qquad (EQ. 1)$$

where I(t) is the intensity at a time t, $\tau=d/\{c|\ln(R)|\}$ is the 1/e (first order) decay constant of the transient signal (i.e. the time for the transient to decay to 1/e of the peak value), d is the separation between the cavity mirrors, c is the speed of light and R is the reflectivity of the cavity mirrors. For example, for water vapor ($H_2O$) absorption at 1881 nm, a cavity decay time of $\tau=14$ µs was obtained for a ~25-cm long cavity, corresponding to a path length of 4.2 km (defined as the distance traveled by light in time t) (see R. Vasudev, et al., Planetary & Space Sci., 92, 127 (2014)). Accordingly, utilizing this path length analysis technique it is possible to determine the optimal mirror reflectivity and cavity path length required at any wavelength of interest for a specified species.

Determination of Target Detection Wavelength

As previously discussed, low concentration gases are hard to detect by conventional techniques, including optical spectroscopy, because of their inherently low atmospheric presence and often their weak light absorption properties. These challenges are only amplified when detection is attempted in ambient environments where other gas species are present and may interfere with the detection of the target species (e.g., may have overlapping absorption spectra). Accordingly, in many embodiments the configuration of the sensor includes the selection of a target detection wavelength(s). In some such embodiments, and, specifically, as pertinent to detection of low concentration gases in ambient air, spectroscopic simulations of the analyte's spectrum is performed and its results compared to spectra of relevant ambient gases, in order to identify the optimal signal target and finalize the precise spectroscopic configuration for the apparatus. In various embodiments, absorption bands of target analyte's infrared spectrum and the spectral lines of ambient gases that overlap with analyte's absorption lines may be obtained using a suitable database, such as for example, the HITRAN spectroscopic database. (See, e.g., L. S. Rothman, J. Quant. Spec. Rad. Transfer, 110, 533-572 (2009), the disclosure of which is incorporated herein by reference.) Utilizing such a database it is possible to identify those lines of an analyte's spectrum that are suitable (e.g., sufficiently strong for detection while not overlapping with the absorption lines of ambient gases (i.e., fall in gaps between absorption lines of ambient gases)).

Beyond merely selecting target wavelength(s) by looking for suitable gaps in overlapping absorption spectrum for co-present gases, many embodiments also incorporate an analysis of the impact a particular wavelength selection has on the requirements of the spectroscopic apparatus. Specifically, in many embodiments, the shortest suitable target wavelengths are optimal. Focusing the detection efforts and apparatus design on the shortest wavelength region of the target spectrum available allows for optimization of such apparatus parameters as: (a) achievable absorption path lengths (dictated by the reflectivity of available cavity mirrors), and (b) the detector performance. For example, when considering the 1563-1626 nm region for $H_2S$ detection, cavity mirrors with very high reflectivity are currently available, corresponding to an absorption path length of ~4 km or more in a 25-cm long cavity. By comparison, the path length attainable in the 7500-9500 nm region is only ~1.25 km. Moreover, detectors operating at lower wavelengths are less noisy. For example, detectors for the 1563-1626 nm region have a photosensitivity parameter $D^*=5 \times 10^{12}$ cm·Hz$^{1/2}$/W, whereas detectors for the 7500-9500 nm region, have $D^*=2 \times 10^{9}$ cm·Hz$^{1/2}$/W. Accordingly, in many embodiments absorption bands at shorter wavelengths, if available, even if of lower intensity, can present the best opportunity for highly sensitive detection in a compact setup.

EXEMPLARY EMBODIMENTS

Exemplary embodiments of systems and apparatus in accordance with the disclosure herein were implemented to demonstrate the detection of $H_2S$. Although specific arrangements of elements and specific selections of operating parameters are described, it will be understood that these specific implementations are provided only for illustrative purposes and are not intended to limit the scope of embodiments of the apparatus and methods.

As previously described, $H_2S$ is a low concentration gas that is hard to detect by conventional air monitoring techniques, including spectroscopy, due to its low atmosphere presence and weak light absorption properties. More specifically, $H_2S$ has an extensive series of densely packed absorption bands in the infrared region, with a total of several thousand vibrational-rotational transitions (shown at low and high-resolution in FIG. 6 and FIG. 7). Although the infrared spectrum of $H_2S$ would appear to provide many possible detection target wavelengths, many of its bands also significantly overlap with those of other air components (as illustrated in FIGS. 3A-C).

Figure 6:
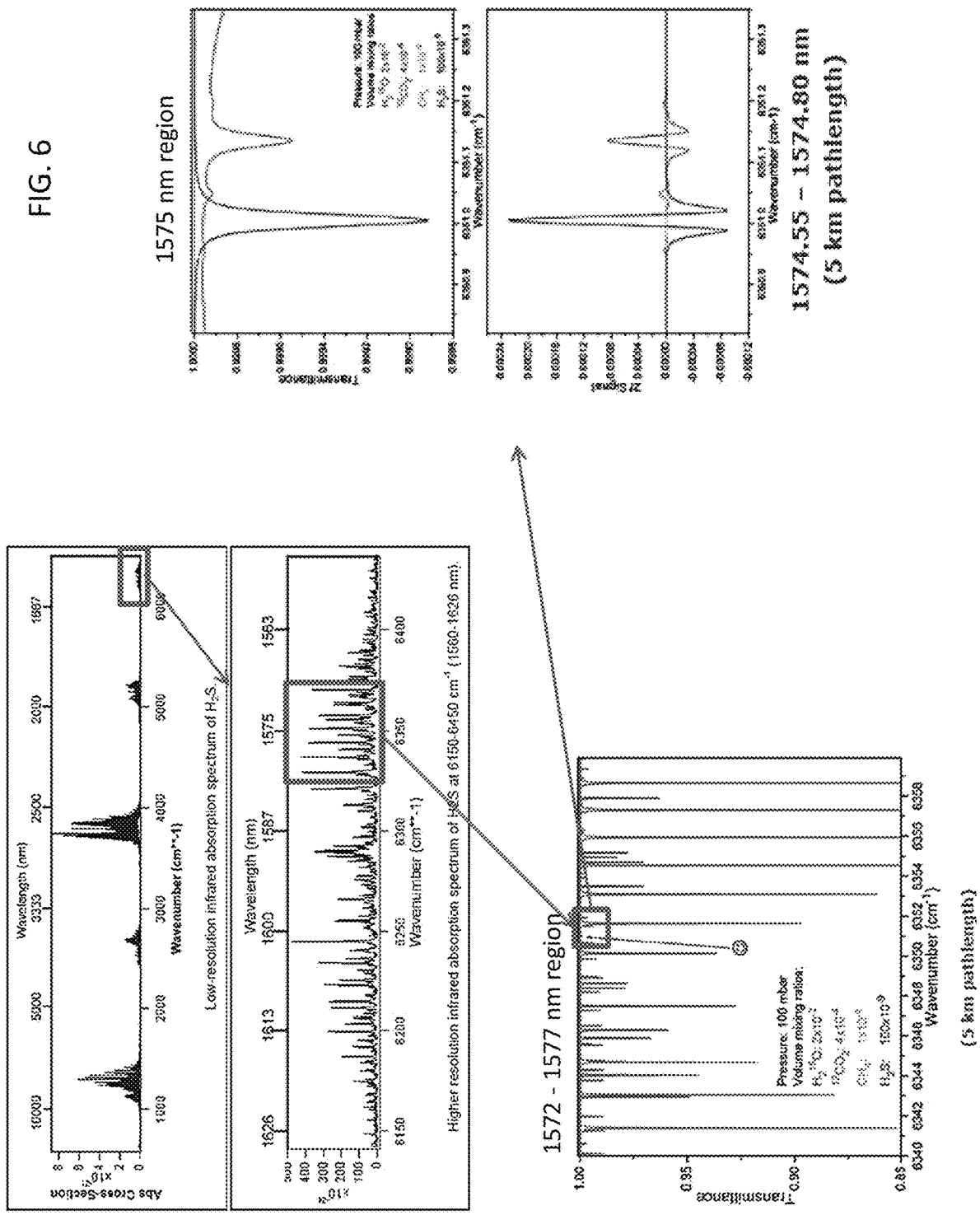
FIG. 6 shows simulated absorption spectra of hydrogen sulfide and several common ambient air components at varying levels of resolution and in a region pertaining to certain embodiments of the current invention.

To demonstrate one embodiment of the present invention and to evaluate WM-CEAS capabilities for the detection of $H_2S$, theoretical spectroscopic simulations in the 1500-9000 nm region of the IR spectrum have been performed using the parameters based on available components (e.g., lasers, detectors and cavity mirrors from commercial sources). FIG. 6 provides an example of how a promising $H_2S$ line may be selected. As shown by the highlighted boxes, an absorption line can be identified at wavelength 6351 $cm^{-1}$ (~1575) nm that is not significantly overlapped by lines of ambient gases. As shown, although this line is not in the strongest absorption region for the target analyte, it is necessary to choose this sub-optimal region because of lack of interference from other species. FIG. 6 also provides a simulated high-resolution absorption spectrum of $H_2S$, along with a 2f spectrum, both of which highlight the favorable qualities of the chosen $H_2S$ signal (e.g., detectable signal intensity and the lack of overlapping peaks from other ambient species).

Figure 7:
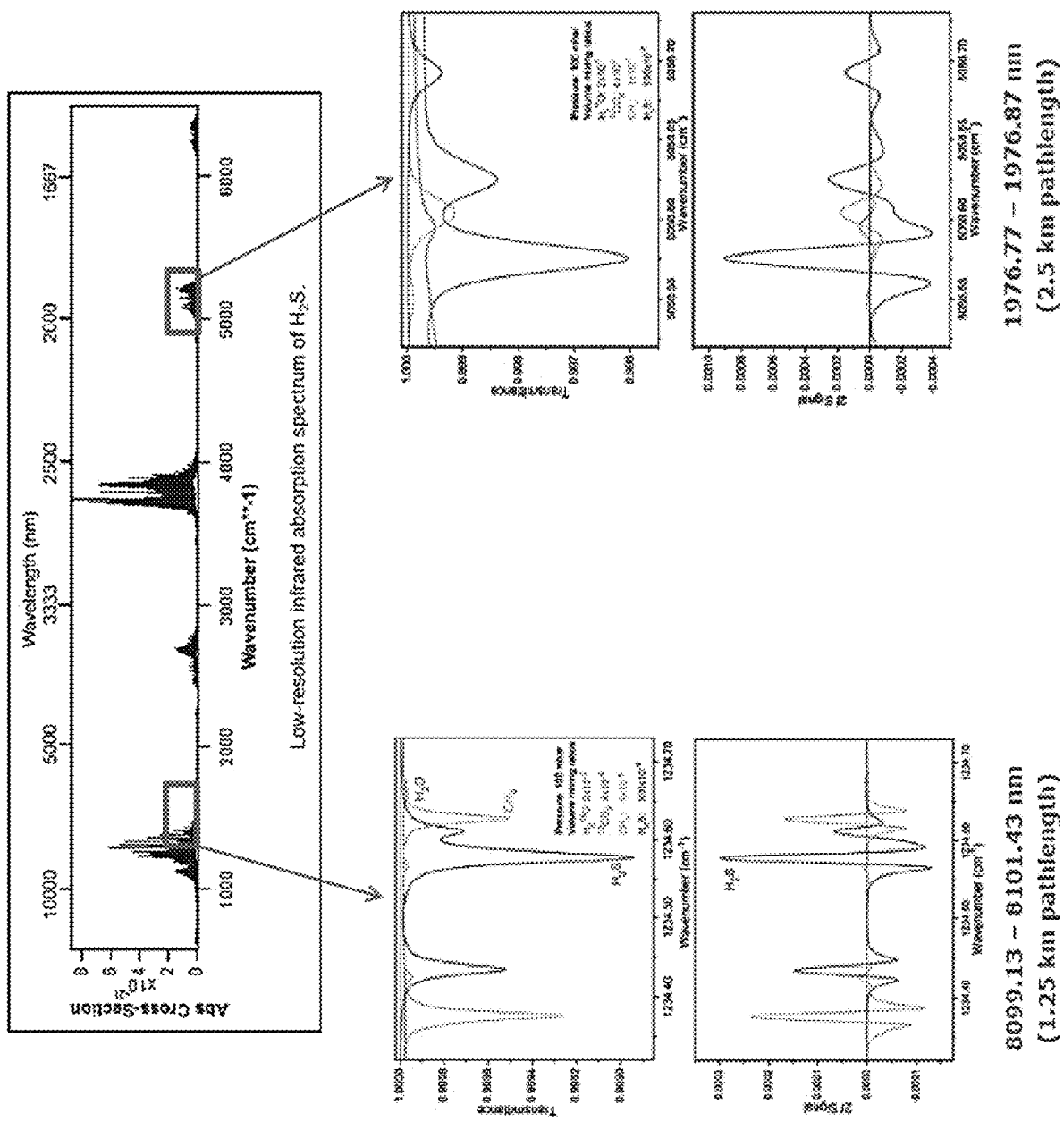
FIG. 7 shows simulated absorption spectra of hydrogen sulfide and several common ambient air components at varying levels of resolution and in regions pertaining to other embodiments of the current invention.

As shown, in FIG. 7, other potentially promising target detection wavelength regions for $H_2S$ detection include feature at 5058.70 $cm^{-1}$ (~1977 nm) and at 1234.58 $cm^{-1}$ (~8100 nm). As can be noticed, the absorption level for the strongest line at ~8100 nm with a transmittance of 0.9990 (FIG. 7, left) is comparable to that at ~1575 nm (see FIG. 6), in spite of having a higher cross-section. This is because of the longer path length possible at ~1575 nm due to superior mirror reflectivity in the near-infrared compared to the longwave infrared. Accordingly, absorption bands at shorter wavelengths (such as those at 1900-2000 nm and 1563-1626 nm regions of $H_2S$ absorption spectrum), if available, even if of lower intensity, present the most promising opportunity for highly sensitive detection of $H_2S$ in a compact setup. These findings demonstrate that a number of apparatus adjustment options are readily available for sensitivity and selectivity optimization, as well as adaptation to a variety of detection application.

Once the optimal detection region of the spectrum is identified, this information is then used for the detection apparatus assembly and optimization. As previously described, the optimization parameters include: (a) the optical cavity parameters for a given wavelength (path length achieved, background noise level, optical fringes, modulation parameters for suppressing the noise and optical fringes), (b) sample pressure for minimizing overlap of adjacent molecular absorption lines, and (c) detection capabilities.

SUMMARY

Gas detection apparatus in accordance with embodiments is characterized by superior detection sensitivity and selectivity for a multitude of substances in a variety of environments. Specifically, as shown in FIG. 1, in many embodiments an absorption cell capable of detecting the presence of gases (such as $H_2S$) in concentrations as low as few hundred ppb may be obtained, which compares favorably to current techniques that require higher concentrations and/or longer detection times.

In addition, the spectroscopic apparatus in accordance with embodiments allows for the packaging of a large path length cell in a small size (e.g., on the order of 25 cm) and at low/moderate weight (≤1.5 kilograms). Moreover, the invention is amenable to further miniaturization and, as a result, multiplexing. Consequently, some embodiments may incorporate a compact system composed of multiple sensors, each adapted for detection of one specific volatile analyte, providing superior detection sensitivity and selectivity for a multitude of hazardous substances in a variety of environments. Instruments made in accordance with embodiments will also be superior to earlier detectors, because gas detection will be selective against other ambient gases including water vapor (which has been known to compromise the performance of semiconductor metal oxide detectors).

DOCTRINE OF EQUIVALENTS

This description of the invention has been presented for the purposes of illustration and description. It is not intended to be exhaustive or to limit the invention to the precise form described, and many modifications and variations are possible in light of the tutorial above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

What is claimed is:

1. A spectroscopic apparatus comprising: a cavity defining a volume, the cavity having at least one gas inlet and one gas outlet for introducing gaseous samples into and extracting gaseous samples from said volume, and one optical inlet and one optical outlet for introducing light into said cavity and extracting an analyte absorption signal from said cavity; two mirrors having characteristic reflectivity disposed on opposite ends of said cavity and configured to form an optical path there between having a characteristic physical length; a light source disposed in optical alignment with the one optical inlet and configured to introduce the light into said cavity along said optical path, the light source wavelength tuning range selected to correspond with at least one absorption wavelength of a selected gaseous analyte; a driver electronics interfaced with the light source and configured to tune and modulate the wavelength of the light; wherein the mirrors and the light source are disposed such that the light introduced into the optical cavity along the optical path is reflected between the two mirrors such that a majority of the light undergoes multiple passes through the cavity prior to exiting the optical outlet, such that a cumulative optical path length traveled by the light while within the cavity is significantly greater than the physical length of the cavity; a detector disposed in optical alignment with the optical outlet and configured to detect the gaseous analyte's absorption signal at a selected absorption wavelength; wherein the absorption wavelength, the mirror reflectivity and the physical length of the cavity are selected to maximize the cumulative optical path length; and wherein reflectivity of the two mirrors and the cumulative optical path length are determined experimentally using a pulsed light source and monitoring a transient signal produced thereby, using the relationship: wherein (t) is an intensity at a time t, T=d/{c 1 ln(R)I} is a 1/e (first order) decay constant of a transient signal, d is the physical length of the optical path, c is the speed of light and R is the reflectivity of the mirrors" has been changed—A spectroscopic apparatus comprising:

an optical cavity defining a volume, the cavity having at least one gas inlet and one gas outlet for introducing gaseous samples into and extracting gaseous samples from said volume, and one optical inlet and one optical outlet for introducing light into said optical cavity and extracting an analyte absorption signal from said optical cavity;

two mirrors having characteristic reflectivity disposed on opposite ends of said optical cavity and configured to form an optical path there between having a characteristic physical length;

a light source disposed in optical alignment with the one optical inlet and configured to introduce the light into said optical cavity along said optical path, the light source wavelength tuning range selected to correspond with at least one absorption wavelength of a selected gaseous analyte;

a driver electronics interfaced with the light source and configured to tune and modulate the wavelength of the light;

wherein the mirrors and the light source are disposed such that the light introduced into the optical cavity along the optical path is reflected between the two mirrors such that a majority of the light undergoes multiple passes through the cavity prior to exiting the optical outlet, such that a cumulative optical path length travelled by the light while within the cavity is significantly greater than the physical length of the optical cavity;

a detector disposed in optical alignment with the optical outlet and configured to detect the gaseous analyte's absorption signal at a selected absorption wavelength;

wherein the absorption wavelength, the mirror reflectivity and the physical length of the cavity are selected to maximize the cumulative optical path length;

wherein reflectivity of the two mirrors and the cumulative optical path length are determined experimentally using a pulsed light source and monitoring a transient signal produced thereby, using the relationship:

$$I(t)=I(t=0)\exp(-t/\tau)$$

wherein I(t) is an intensity at a time t, $\tau=d/\{c|\ln(R)|\}$ is a 1/e (first order) decay constant of a transient signal, d is the physical length of the optical path, c is the speed of light and R is the reflectivity of the mirrors; and wherein the selected gaseous analyte is $H_2S$, and wherein the absorption wavelength is selected from one of 8000-9000 nm, 1900-2000 nm, and 1563-1626 nm regions.

2. The spectroscopic apparatus of claim 1, wherein the light source is a tunable laser capable of emitting in a wavelength range selected from the group consisting of ultraviolet, visible or infrared wavelengths.

3. The spectroscopic apparatus of claim 1, wherein the physical length of the cavity is less than a meter long and the cumulative optical path length is greater than a kilometer.

4. The spectroscopic apparatus of claim 1, wherein the gaseous sample comprises a mixture of species and the at least one absorption wavelength is selected such that it does not overlap with absorption lines of the mixture of species disposed within the gaseous sample.

5. The spectroscopic apparatus of claim 1, wherein the two mirrors comprise a pair of plano-concave mirrors.

6. The spectroscopic apparatus of claim 1, wherein the at least one gas inlet and outlet incorporate at least one valve each, and wherein the gas outlet is connected to a vacuum pump capable of inducing a flow of the gas sample through the cavity.

7. The spectroscopic apparatus of claim 1, wherein the light source is disposed such that the light is introduced into the cavity in a geometry that is off-axis from the optical path.

8. The spectroscopic apparatus of claim 1, wherein the apparatus further comprises a collimating lens disposed between the light source and the optical inlet.

9. The spectroscopic apparatus of claim 1, wherein the absorption wavelength is selected from one of 1575 nm, 1977 nm and 8100 nm, and wherein the apparatus is capable of detecting the selected analyte at concentrations on the order of a few hundred ppb.

10. A method of detecting a gaseous species comprising:
introducing a gas sample comprising a mixture of species disposed therein into a cavity defining a volume through at least one gas inlet configured to allow the introduction of gas samples into said volume, wherein the cavity comprises two mirrors having characteristic reflectivity disposed on opposite ends of said cavity and configured to form an optical path there between having a characteristic physical length;

producing wavelength modulation in a slight source;

injecting the light from the light source through an optical inlet disposed in the cavity such that the light travels along said optical path, the light having a characteristic wavelength selected to correspond with at least one absorption wavelength of a target analyte;

allowing the light to be reflected between the two mirrors such that a majority of the light undergoes multiple passes through the cavity, such that a cumulative optical path length traveled by the light within the cavity is significantly greater than the physical length of the physical length of the cavity;

determining the reflectivity of the two mirrors and the cumulative path length comprising the steps of:
evacuating the cavity;
injecting a pulsed light into said cavity along the optical path;
detecting the light transmitted through the cavity;
monitoring the decay of a transient transmission over time to determine the decay constant of the transient signal;
detecting an analyte absorption from a transmission spectrum with a detector positioned outside the cavity and by monitoring the at least one absorption wavelength of the target analyte; and wherein the at least one absorption wavelength of the target analyte is selected from within one or more wavelength regions at which the target analyte absorbs and at which the other species in the gas sample do not absorb; and wherein the mirror reflectivity and the physical length of the cavity are selected to maximize the cumulative optical path length.

11. The method of claim 10, further comprising using a vacuum pump to introduce a pressure differential between the cavity and an external sample source, thus inducing a flow of the sample through the cavity.

12. The method of claim 10, wherein the light is introduced into the cavity in a geometry that is off-axis from the optical path.

13. The method of claim 10, further comprising disposing a collimating lens between the light source and the optical inlet.

14. The method of claim 10, wherein the light source is used in a pulsed mode and the transient transmission is monitored, and the reflectivity of the cavity mirrors and the cumulative optical path length achieved are determined using the relationship for time-dependence of the transient signal:

$$I(t)=I(t=0)\exp(-t/\tau)$$

wherein I(t) is an intensity at a time t, $\tau=d/\{c|\ln(R)|\}$ is a 1/e (first order) decay constant of a transient signal, d is the physical length of the optical path, c is the speed of light and R is the reflectivity of the mirrors.

15. The method of claim 10, wherein the target analyte is $H_2S$, and wherein the at least one absorption wavelength is selected from one of 8000-9000 nm, 1900-2000 nm, and 1563-1626 nm regions.

16. The method of claim 15, wherein the at least one absorption wavelength is selected from one of 1575 nm, 1977 nm and 8100 nm regions, and wherein the method is capable of detecting the target analyte at concentrations on the order of few hundred ppb.

17. The method of claim 10, wherein the absorption wavelength is determined by analysis of the analyte and other species absorption spectrum from the HITRAN spectroscopic database.

* * * * *